(12) United States Patent
Hazeki

(10) Patent No.: US 9,067,737 B2
(45) Date of Patent: Jun. 30, 2015

(54) BELT-DEVIATION SUPPRESSION STRUCTURE, TRANSFER DEVICE, AND IMAGE FORMING APPARATUS

(71) Applicant: FUJI XEROX CO., LTD., Tokyo (JP)

(72) Inventor: Shingo Hazeki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/185,002

(22) Filed: Feb. 20, 2014

(65) Prior Publication Data

US 2015/0027857 A1   Jan. 29, 2015

(30) Foreign Application Priority Data

Jul. 25, 2013 (JP) ................................. 2013-154968

(51) Int. Cl.
*B65G 21/06* (2006.01)
*B65G 15/64* (2006.01)

(52) U.S. Cl.
CPC ....................................... *B65G 15/64* (2013.01)

(58) Field of Classification Search
USPC ......... 198/586, 782, 806, 807, 813, 814, 837, 198/840, 841, 842, 843, 861.1; 399/121, 399/317
See application file for complete search history.

(56) References Cited

U.S. PATENT DOCUMENTS

| 3,087,601 | A | * | 4/1963 | Lo Presti | 198/828 |
| 4,183,658 | A | * | 1/1980 | Winthaegen | 399/165 |
| 4,425,034 | A | * | 1/1984 | Roodbergen | 399/164 |
| 5,258,816 | A | * | 11/1993 | Haneda et al. | 399/165 |
| 5,276,485 | A | * | 1/1994 | Osbourne et al. | 399/164 |
| 5,762,179 | A | * | 6/1998 | Oury et al. | 198/861.1 |
| 6,454,083 | B2 | * | 9/2002 | Burkhart et al. | 198/823 |
| 6,695,131 | B2 | * | 2/2004 | Swinderman | 198/827 |
| 6,766,128 | B2 | * | 7/2004 | Jaskowiak | 399/164 |
| 7,290,650 | B2 | * | 11/2007 | Forman | 198/805 |
| 7,422,100 | B2 | * | 9/2008 | Forman | 198/805 |
| 7,497,326 | B2 | * | 3/2009 | McGuire et al. | 198/861.1 |
| 7,594,654 | B2 | * | 9/2009 | Matsumoto | 271/193 |
| 7,641,045 | B2 | * | 1/2010 | Ishikawa et al. | 198/867.15 |
| 7,673,741 | B2 | * | 3/2010 | Nemedi | 198/841 |
| 8,123,023 | B2 | * | 2/2012 | Williams et al. | 198/689.1 |
| 8,460,139 | B2 | * | 6/2013 | Parks | 474/130 |

FOREIGN PATENT DOCUMENTS

| JP | A-10-152242 | 6/1998 |
| JP | A-11-79457 | 3/1999 |
| JP | A-2002-2999 | 1/2002 |

* cited by examiner

*Primary Examiner* — Douglas Hess
(74) *Attorney, Agent, or Firm* — Oliff PLC

(57) ABSTRACT

A belt-deviation suppression structure includes a contact member, receivers, and multiple link members. The contact member is in contact with a rotatable belt and extends longitudinally in an intersecting direction that intersects a moving direction of the belt. The receivers are provided at opposite sides of the contact member in the intersecting direction and receive a pressing force from the belt as the belt moves in the intersecting direction. The link members are arranged in the intersecting direction. Each link member has a first end that is connected to a base in a rotatable manner about an axis extending in the moving direction and has a second end that is connected to the contact member in a rotatable manner about an axis extending in the moving direction.

6 Claims, 9 Drawing Sheets

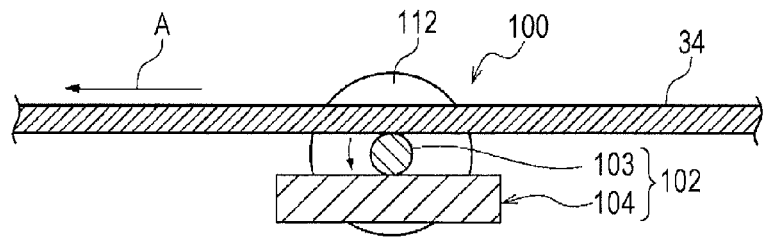
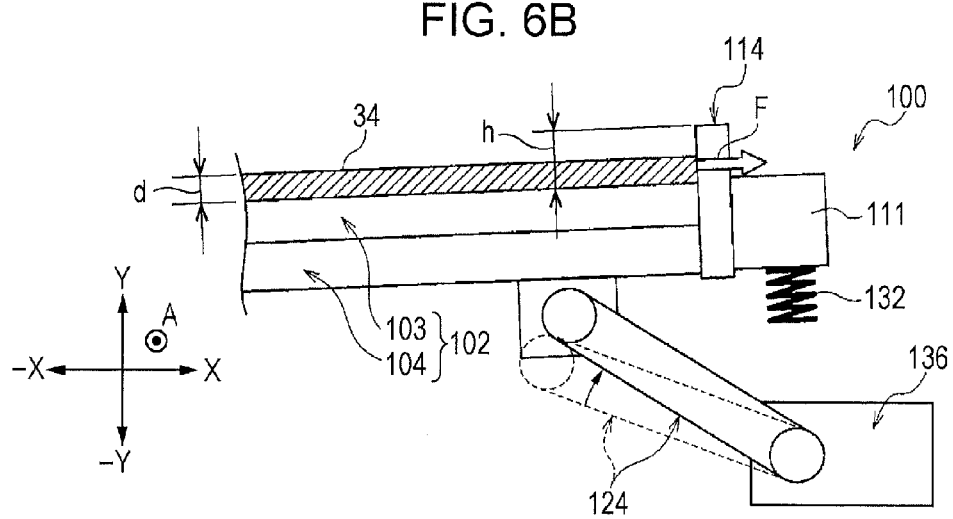
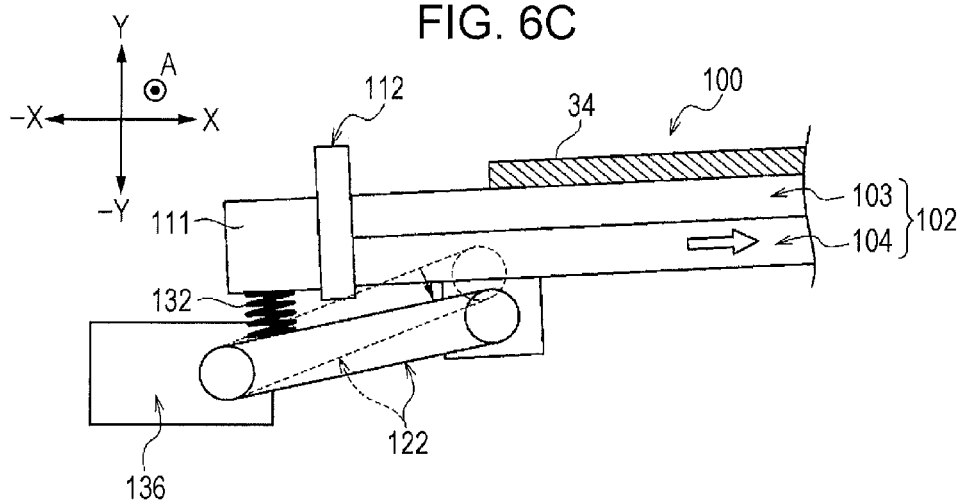

BELT-DEVIATION SUPPRESSION STRUCTURE, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2013-154968 filed Jul. 25, 2013.

BACKGROUND

Technical Field

The present invention relates to belt-deviation suppression structures, transfer devices, and image forming apparatuses.

SUMMARY

According to an aspect of the invention, there is provided a belt-deviation suppression structure including a contact member, receivers, and multiple link members. The contact member is in contact with a rotatable belt and extends longitudinally in an intersecting direction that intersects a moving direction of the belt. The receivers are provided at opposite sides of the contact member in the intersecting direction and receive a pressing force from the belt as the belt moves in the intersecting direction. The link members are arranged in the intersecting direction. Each link member has a first end that is connected to a base in a rotatable manner about an axis extending in the moving direction and has a second end that is connected to the contact member in a rotatable manner about an axis extending in the moving direction.

BRIEF DESCRIPTION OF THE DRAWINGS

An exemplary embodiment of the present invention will be described in detail based on the following figures, wherein:

FIG. 6A is a cross-sectional view schematically illustrating a contact state between the intermediate transfer belt and a rotatable member of the belt-deviation suppression structure according to this exemplary embodiment, FIG. 6B schematically illustrates one end of the belt-deviation suppression structure according to this exemplary embodiment when the intermediate transfer belt moves toward that end, and FIG. 6C schematically illustrates the other end of the belt-deviation suppression structure according to this exemplary embodiment;

DETAILED DESCRIPTION

A belt-deviation suppression mechanism, a transfer device, and an image forming apparatus according to an exemplary embodiment will be described below with reference to the drawings. First, the configuration and the operation of the image forming apparatus and the transfer device will be described. Then, the configuration and the operation of the belt-deviation suppression structure, which is a relevant part of this exemplary embodiment, will be described.

In the following description, a direction indicated by an arrow Y in FIG. 1 will be defined as "apparatus height direction", and a direction indicated by an arrow Z will be defined as "apparatus width direction". Furthermore, a direction (indicated by an arrow X) orthogonal to the apparatus height direction and the apparatus width direction will be defined as "apparatus depth direction". When an image forming apparatus 10 is viewed from a side where a user (not shown) stands (i.e., front view), the apparatus height direction, the apparatus width direction, and the apparatus depth direction are described as an Y direction, a Z direction, and an X direction, respectively.

When one side and the other side of each of the X direction, the Y direction, and the Z direction are to be distinguished from each other as viewed from the front of the image forming apparatus 10, the upper side will be described as a Y side, the lower side will be described as a –Y side, the right side will be described as a Z side, the left side will be described as a –Z side, the front side will be described as an X side, and the rear side will be described as a –X side.

Overall Configuration

Figure 1:
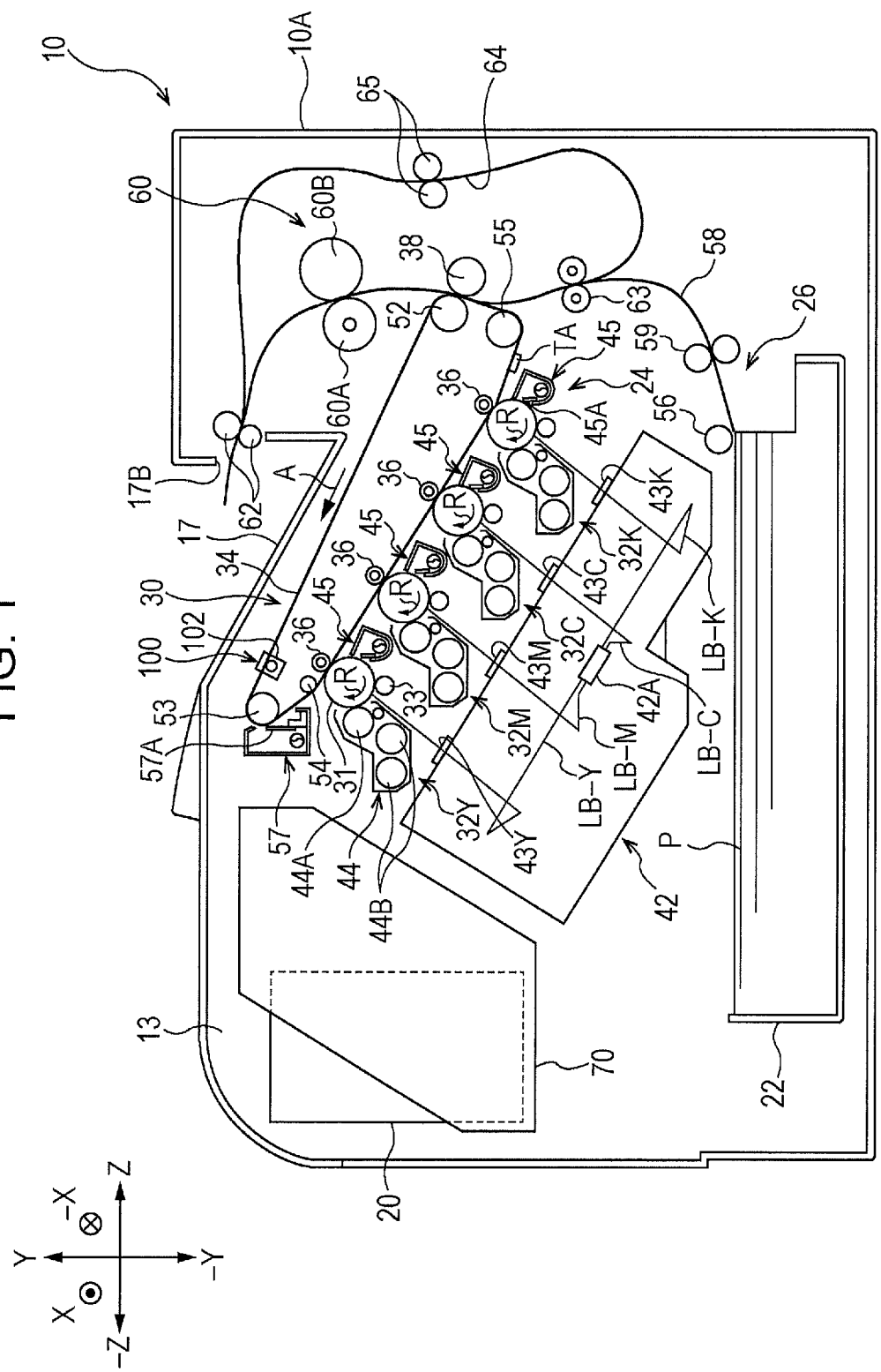
FIG. 1 schematically illustrates the overall configuration of an image forming apparatus according to an exemplary embodiment.

As shown in FIG. 1, the image forming apparatus 10 has an apparatus body 10A that has a cover member (not shown) externally attached thereto and that is provided with components therein. The image forming apparatus 10 also has a sheet accommodation section 22 that accommodates a sheet P as an example of a recording medium, an image forming section 24 that forms an image onto the sheet P, and a transport section 26 that transports the sheet P from the sheet accommodation section 22 toward the image forming section 24. Moreover, the image forming apparatus 10 has a fixing device 60 that fixes the image formed at the image forming section 24 onto the sheet P, and a controller 20 that controls the operation of each section of the image forming apparatus 10.

Image Forming Section

The image forming section 24 has image forming units 32Y, 32M, 32C, and 32K that respectively form yellow (Y), magenta (M), cyan (C), and black (K) toner images TA as an example of developer images. The image forming section 24 also has a transfer device 30 that transfers the toner images TA formed at the image forming units 32Y, 32M, 32C, and 32K onto the sheet P, and first-transfer rollers 36 as an example of an auxiliary transfer unit.

The image forming units 32Y, 32M, 32C, and 32K are arranged within the apparatus body 10A in an inclined fashion relative to the Z direction. Furthermore, the image forming units 32Y, 32M, 32C, and 32K individually have photoconductors 31 as an example of image bearing members that bear the toner images TA.

The image forming units 32Y, 32M, 32C, and 32K have identical configurations. Therefore, with regard to the reference characters of components included in the image forming units 32Y, 32M, 32C, and 32K, the characters Y, M, C, and K are omitted therefrom in FIG. 1. Furthermore, when the image forming units 32Y, 32M, 32C, and 32K are not to be distinguished from one another in the following description, the characters Y, M, C, and K may sometimes be omitted therefrom.

Photoconductors

The photoconductors 31 are each constituted of a cylindrical electrically-conductive support member that is electrically grounded and a photoconductive layer provided on the outer peripheral surface of the support member. Each photoconductor 31 is configured to bear an electrostatic latent image (as an example of a latent image) and the corresponding toner image TA and also to rotate in an R direction (clockwise direction in FIG. 1) at a preset rotational speed. Each photoconductor 31 is surrounded by a charging roller 33, an exposure device 42, a developing device 44, and a cleaning unit 45 in this order from the upstream side of the photoconductor 31 in the rotational direction thereof. Moreover, the photoconductors 31 are disposed facing the outer peripheral surface of an intermediate transfer belt 34, which will be described later.

Charging Rollers

Each charging roller 33 is constituted of, for example, an electrically-conductive shaft (not shown) and an electrically-conductive elastic layer formed around the shaft. The shaft of the charging roller 33 receives voltage that allows for discharging from a voltage applying unit (not shown). Thus, discharging is performed due to a potential difference between the charging roller 33 and the electrically-grounded photoconductor 31, whereby the outer peripheral surface of the photoconductor 31 becomes electrostatically charged to, for example, a negative polarity (i.e., the same polarity as the toner).

Exposure Device

The exposure device 42 is provided obliquely below the image forming units 32Y, 32M, 32C, and 32K and is configured to form electrostatic latent images on the outer peripheral surfaces of the photoconductors 31, electrostatically charged by the charging rollers 33, by exposing the outer peripheral surfaces with light. Specifically, the exposure device 42 is provided with four semiconductor lasers (not shown) that correspond to the four image forming units 32Y, 32M, 32C, and 32K. In the exposure device 42, these semiconductor lasers emit laser beams LB-Y, LB-M, LB-C, and LB-K in accordance with gradation data.

The laser beams LB-Y, LB-M, LB-C, and LB-K emitted from the semiconductor lasers are radiated onto a polygon mirror 42A, which is a rotating polygon mirror, via a cylindrical lens (not shown) and are deflected and scanned by the polygon mirror 42A. The laser beams LB-Y, LB-M, LB-C, and LB-K deflected and scanned by the polygon mirror 42A respectively travel through glass windows 43Y, 43M, 43C, and 43K so as to become scanned and radiated onto exposure points on the photoconductors 31.

In FIG. 1, imaging lenses and multiple mirrors that transmit and reflect the laser beams LB-Y, LB-M, LB-C, and LB-K are omitted. The electrostatic latent images on the photoconductors 31 are formed on the basis of an image signal transmitted from the controller 20. The image signal transmitted from the controller 20 is, for example, an image signal acquired by the controller 20 from an external device.

Developing Devices

Each developing device 44 has a rotatable developing roller 44A that supplies a developer (as an example of a toner) to the corresponding photoconductor 31, and multiple transport members 44B that circulate and transport the developer toward the developing roller 44A while stirring the developer. The developing devices 44 develop the electrostatic latent images formed on the photoconductors 31 due to the exposure process performed by the exposure device 42, thereby forming the toner images TA.

Cleaning Units

Each cleaning unit 45 has a cleaning blade 45A. An edge of the cleaning blade 45A is in contact with the outer peripheral surface of the corresponding photoconductor 31. Thus, the cleaning unit 45 is configured to scrape off residual toner and paper particles from the outer peripheral surface of the photoconductor 31 after a first-transfer process.

The image forming units 32Y, 32M, 32C, and 32K are each provided with the photoconductor 31, the charging roller 33, the developing device 44, and the cleaning unit 45 within a housing (not shown). The image forming units 32Y, 32M, 32C, and 32K are attached as a single unit to the apparatus body 10A or are removed (detached) as a single unit from the apparatus body 10A.

Transfer Device

Next, the transfer device 30 will be described.

The transfer device 30 has the intermediate transfer belt 34 as an example of a belt, a second-transfer roller 38 as an example of a transfer unit that transfers (second-transfers) the toner images TA on the intermediate transfer belt 34 onto the sheet P, and a belt-deviation suppression structure 100 to be described later.

Intermediate Transfer Belt

The intermediate transfer belt 34 is an endless (ring-shaped) belt formed by impregnating resin, such as polyimide or polyamide, with an appropriate amount of an antistatic agent, such as carbon black. The intermediate transfer belt 34 is provided in a rotatable manner at the Y side (i.e., the upper side) of the image forming units 32Y, 32M, 32C, and 32K.

In detail, the intermediate transfer belt 34 is wrapped around a drive roller 53 that drives the intermediate transfer belt 34, a driven roller 52, a wrapping roller 54, and a tension applying roller 55. When the drive roller 53 is rotationally driven, the intermediate transfer belt 34 rotates in one direction (e.g., in the counterclockwise direction (the direction of the arrow A in FIG. 1)) while being in contact with the photoconductors 31.

The drive roller 53 is provided within the apparatus body 10A at a central part in the Z direction and an upper part in the Y direction and is rotatable about an axis extending in the X direction. The drive roller 53 is driven by a motor (not shown) controlled by the controller 20 so as to rotate in the counterclockwise direction in FIG. 1.

The driven roller 52 is provided within the apparatus body 10A toward the Z side relative to the central part in the Z direction and at a central part in the Y direction and is rotatable about an axis extending in the X direction. Specifically, the driven roller 52 is disposed at a position located at the Z side and the −Y side (i.e., at an obliquely lower position) relative to the drive roller 53. When the intermediate transfer belt 34 rotates, the driven roller 52 is rotated (driven) in the counterclockwise direction in FIG. 1. The driven roller 52 serves as an opposing roller disposed facing the second-transfer roller 38 with the intermediate transfer belt 34 interposed therebetween.

The wrapping roller 54 is provided within the apparatus body 10A at a position located at the Z side of the drive roller 53 (i.e., at the −Z side of the driven roller 52) and at the −Y side (i.e., at an obliquely lower position) relative to the drive roller 53 and is rotatable about an axis extending in the X direction. When the intermediate transfer belt 34 rotates, the wrapping roller 54 is rotated in the counterclockwise direction in FIG. 1.

The tension applying roller 55 is provided within the apparatus body 10A at a position located slightly toward the −Z side and the −Y side (i.e., at an obliquely lower position) relative to the driven roller 52 and is rotatable about an axis extending in the X direction. The tension applying roller 55 has a shaft that is biased by a spring (not shown) toward the outer side of the intermediate transfer belt 34, thereby applying tension to the intermediate transfer belt 34. When the intermediate transfer belt 34 rotates, the tension applying roller 55 is rotated in the counterclockwise direction in FIG. 1.

First-Transfer Rollers

The first-transfer rollers 36 face the corresponding photoconductors 31 with the intermediate transfer belt 34 interposed therebetween. First-transfer positions where the toner images TA formed on the photoconductors 31 are transferred onto the intermediate transfer belt 34 are formed between the first-transfer rollers 36 and the photoconductors 31. The first-transfer rollers 36 each receive voltage from a voltage applying unit (not shown). Due to a potential difference between the first-transfer rollers 36 and the electrically-grounded photoconductors 31, the first-transfer rollers 36 transfer (first-transfer) the toner images TA on the photoconductors 31 onto the intermediate transfer belt 34.

The drive roller 53, the driven roller 52, the wrapping roller 54, the tension applying roller 55, and the four first-transfer rollers 36 are rotatably supported by sidewalls 41A and 41B (see FIG. 2), which constitute a part of a body of the transfer device 30, via shaft bearings (not shown). The sidewalls 41A and 41B are plate-shaped members disposed facing each other in the X direction.

Second-Transfer Roller

The second-transfer roller 38 faces the driven roller 52 with the intermediate transfer belt 34 interposed therebetween. A second-transfer position where the toner images TA are transferred onto the sheet P is formed between the second-transfer roller 38 and the driven roller 52. The second-transfer roller 38 receives voltage from a voltage applying unit (not shown). Due to a potential difference between the second-transfer roller 38 and the electrically-grounded driven roller 52, the second-transfer roller 38 transfers (second-transfers) the toner images TA on the intermediate transfer belt 34 onto the sheet P.

A cleaning unit 57 is disposed facing the drive roller 53 with the intermediate transfer belt 34 interposed therebetween and is configured to remove residual toner and paper particles from the outer peripheral surface of the intermediate transfer belt 34 after the second-transfer process. The cleaning unit 57 has a cleaning blade 57A. An edge of the cleaning blade 57A is in contact with the outer peripheral surface of the intermediate transfer belt 34. Thus, the cleaning unit 57 is configured to scrape off residual toner and paper particles from the outer peripheral surface of the intermediate transfer belt 34.

Transport Section

The transport section 26 has a feed roller 56 that feeds the sheet P accommodated in the sheet accommodation section 22, a transport path 58 along which the sheet P fed by the feed roller 56 is transported, a transport roller 59 disposed along the transport path 58, and a positioning roller 63.

The transport path 58 extends from the sheet accommodation section 22 to an output section 17, which is provided at an upper part of the apparatus body 10A, via the second-transfer position. The positioning roller 63 is configured to transport the sheet P to the second-transfer position in accordance with a timing at which the toner images TA formed on the intermediate transfer belt 34 reach the second-transfer position. The fixing device 60 that fixes the toner images TA formed on the sheet P by the image forming section 24 onto the sheet P is provided at a position downstream of the second-transfer position in the transport path 58.

Fixing Device

The fixing device 60 has a heating roller 60A having a heat source (e.g., a halogen lamp) therein and a pressure roller 60B that applies pressure to the sheet P by nipping it together with the heating roller 60A. The heating roller 60A is provided at the intermediate transfer belt 34 side relative to the transport path 58. An output roller 62 that outputs the sheet P having the toner images TA fixed thereon toward the output section 17 is provided at a position downstream of the fixing device 60 in the transport path 58.

In the apparatus body 10A, an inversion transport path 64 that turns over the sheet P having the toner images TA fixed on a front face thereof and transports the sheet P to the second-transfer position again is provided opposite the intermediate transfer belt 34 relative to the transport path 58. The inversion transport path 64 is provided with a transport roller 65. In a case where images are to be formed on both faces of the sheet P, the sheet P having the toner images TA formed on the front face thereof is switched back by reverse rotation of the output roller 62 and is introduced into the inversion transport path 64. Then, the sheet P is transported to the second-transfer position via the positioning roller 63. Thus, image forming operation is performed on the reverse face (i.e., both faces) of the sheet P.

A toner-cartridge load section 70 for resupplying toner to each developing device 44 is provided at the −Z side within the apparatus body 10A. The interior of the toner-cartridge load section 70 is divided into four levels in the Y direction such that toner cartridges (not shown) for the four colors are attachable in the −X direction or detachable in the X direction.

Image Forming Operation

Next, image forming operation performed by the image forming apparatus 10 will be described.

As shown in FIG. 1, in the image forming apparatus 10, the sheet P fed by the feed roller 56 from the sheet accommodation section 22 is transported by the transport roller 59 and is delivered to the second-transfer position by the positioning roller 63.

In each of the image forming units 32Y, 32M, 32C, and 32K, the photoconductor 31 electrostatically charged by the charging roller 33 is exposed to light emitted from the exposure device 42, whereby an electrostatic latent image is formed on the photoconductor 31. This electrostatic latent image is developed by the developing device 44, whereby a toner image TA is formed on the photoconductor 31. Then, the toner images TA of the respective colors formed at the image forming units 32Y, 32M, 32C, and 32K are superposed onto the intermediate transfer belt 34 at the first-transfer positions (i.e., the toner images TA become a color image).

The superposed toner images TA are transferred onto the sheet P at the second-transfer position.

Then, the sheet P having the toner images TA transferred thereon is transported to the fixing device 60. The fixing device 60 fixes the toner images TA onto the sheet P. In a case where the toner images TA are to be formed on the front face (one face) of the sheet P, the sheet P is output to the output section 17 by the output roller 62 after the toner images TA are fixed. On the other hand, in a case where images are to be formed on both faces of the sheet P, the sheet P is delivered to the inversion transport path 64 after the toner images TA are formed on one face of the sheet P. Then, the sheet P is delivered to the second-transfer position again from the inversion transport path 64. Subsequently, toner images TA are formed on the opposite face (reverse face) not having images formed thereon in accordance with a process similar to the above. The sheet P is then output to the output section 17 by the output roller 62. The image forming operation is performed in this manner.

Configuration of Relevant Part

Next, the belt-deviation suppression structure 100 will be described.

As shown in FIG. 1, the belt-deviation suppression structure 100 is provided, for example, in an area located upstream of the drive roller 53 and downstream of the driven roller 52 in the moving direction (the direction of the arrow A) of the intermediate transfer belt 34 and is disposed at a position near the drive roller 53.

Figure 2:
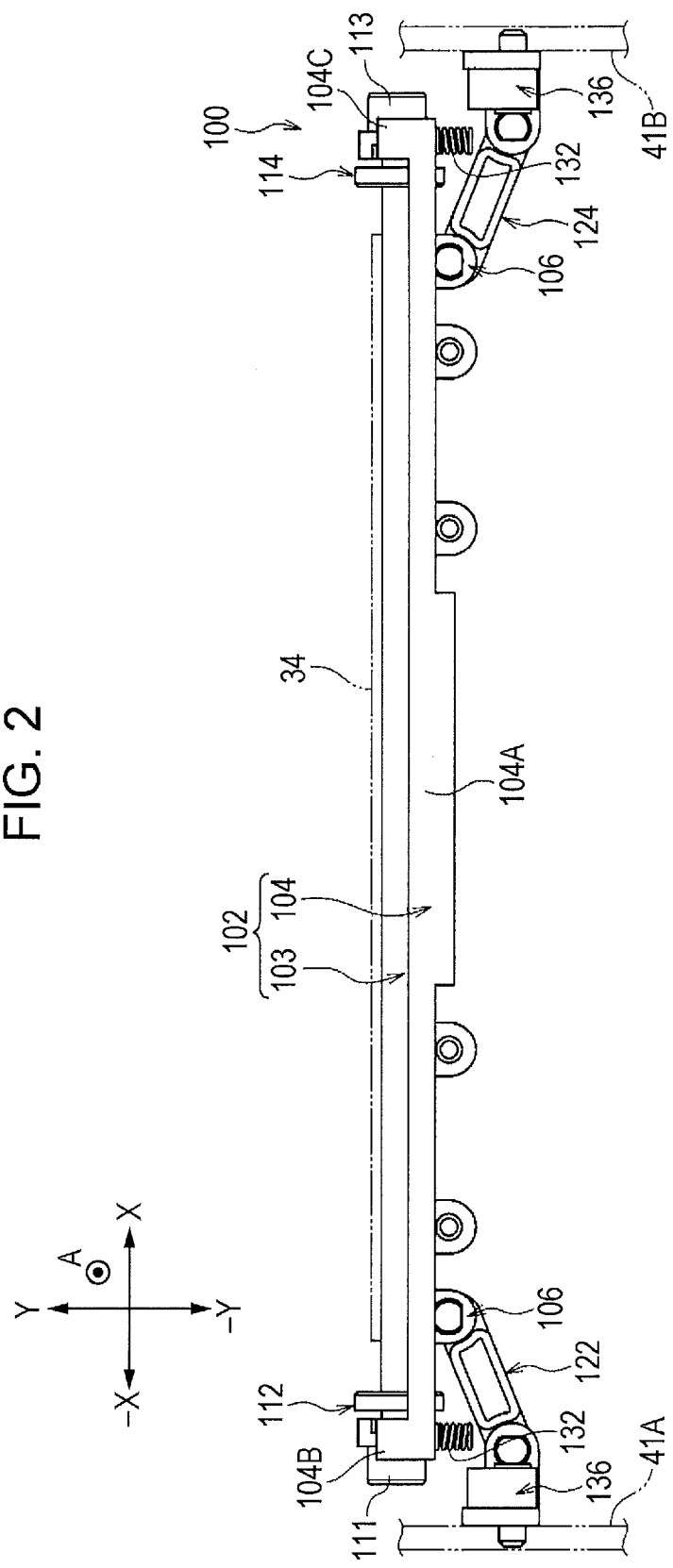
FIG. 2 is a front view of a belt-deviation suppression structure according to the exemplary embodiment, as viewed in a moving direction of an intermediate transfer belt.

As shown in FIG. 2, the belt-deviation suppression structure 100 has a contact member 102 that is in contact with the inner surface of the intermediate transfer belt 34, receivers 112 and 114 that receive a pressing force from the intermediate transfer belt 34, and link members 122 and 124 connected to the contact member 102. Furthermore, the belt-deviation suppression structure 100 also has compression coil springs 132 as an example of an applying unit that applies a resistance force that resists the contact member 102 and the link members 122 and 124 from coming into contact with each other.

The receiver 112 and the link member 122 are provided at the −X side of the contact member 102, and the receiver 114 and the link member 124 are provided at the X side of the contact member 102. The receiver 114 has a configuration similar to that of the receiver 112, and the link member 124 has a configuration similar to that of the link member 122. The receiver 112 and the receiver 114 are symmetrically arranged with respect to the center position of the contact member 102 in the X direction. Likewise, the link member 122 and the link member 124 are symmetrically arranged with respect to the center position of the contact member 102 in the X direction. Therefore, the following description will be directed to the receiver 112 and the link member 122, and descriptions of the receiver 114 and the link member 124 may sometimes be omitted.

Contact Member

The contact member 102 extends longitudinally in the X direction, which is an intersecting direction that intersects (for example, is orthogonal to) the moving direction (the direction of the arrow A) of the intermediate transfer belt 34, and is in contact with the inner surface of the intermediate transfer belt 34. In detail, the contact member 102 includes a rotatable member 103 that is in contact with the inner surface of the intermediate transfer belt 34 and a support member 104 that rotatably supports the rotatable member 103. As described above, the contact member 102 is disposed upstream of the drive roller 53 and downstream of the driven roller 52 in the moving direction of the intermediate transfer belt 34.

Rotatable Member

The rotatable member 103 is, for example, a columnar member composed of stainless steel, has an axis extending in the X direction, and is disposed such that a part of the outer peripheral surface thereof is in contact with the inner surface of the intermediate transfer belt 34. The length of the rotatable member 103 in the X direction is greater than the width of the intermediate transfer belt 34 in the X direction, and the opposite ends of the rotatable member 103 in the X direction protrude from the opposite edges of the intermediate transfer belt 34. Furthermore, the opposite ends of the rotatable member 103 in the X direction are each provided with a recess 103A (see FIG. 5) that extends continuously in the circumferential direction and that is recessed inward in the radial direction. The receivers 112 and 114 to be described later are fitted into these recesses 103A.

Support Member

The support member 104 has a plate portion 104A extending longitudinally in the X direction and laterally in the A direction, a regulating portion 104B standing upright toward the Y side at the −X side of the plate portion 104A, and a regulating portion 104C standing upright toward the Y side at the X side of the plate portion 104A. Shaft bearings 111 and 113 that rotatably support the rotatable member 103 are attached to the regulating portions 104B and 104C, respectively. Since the shaft bearing 111 and the shaft bearing 113 have identical configurations, the shaft bearing 111 will be described, and a description of the shaft bearing 113 will be omitted.

The plate portion 104A is disposed facing the intermediate transfer belt 34. The plate portion 104A has columnar bosses 105 (see FIG. 5) that are provided at the opposite ends of the plate portion 104A in the X direction and that protrude toward the −Y side from the lower surface of the plate portion 104A in the Y direction. Moreover, the plate portion 104A has two connection portions 106 that are provided toward the center of the plate portion 104A in the X direction relative to the bosses 105, are spaced apart from each other in the X direction, and protrude toward the −Y side from the lower surface of the plate portion 104A in the Y direction.

The two connection portions 106 are symmetrically arranged at the −X side and the X side, respectively, with respect to the center of the plate portion 104A in the X direction. Furthermore, the connection portions 106 are connected to first ends of the link members 122 and 124.

Figure 4:
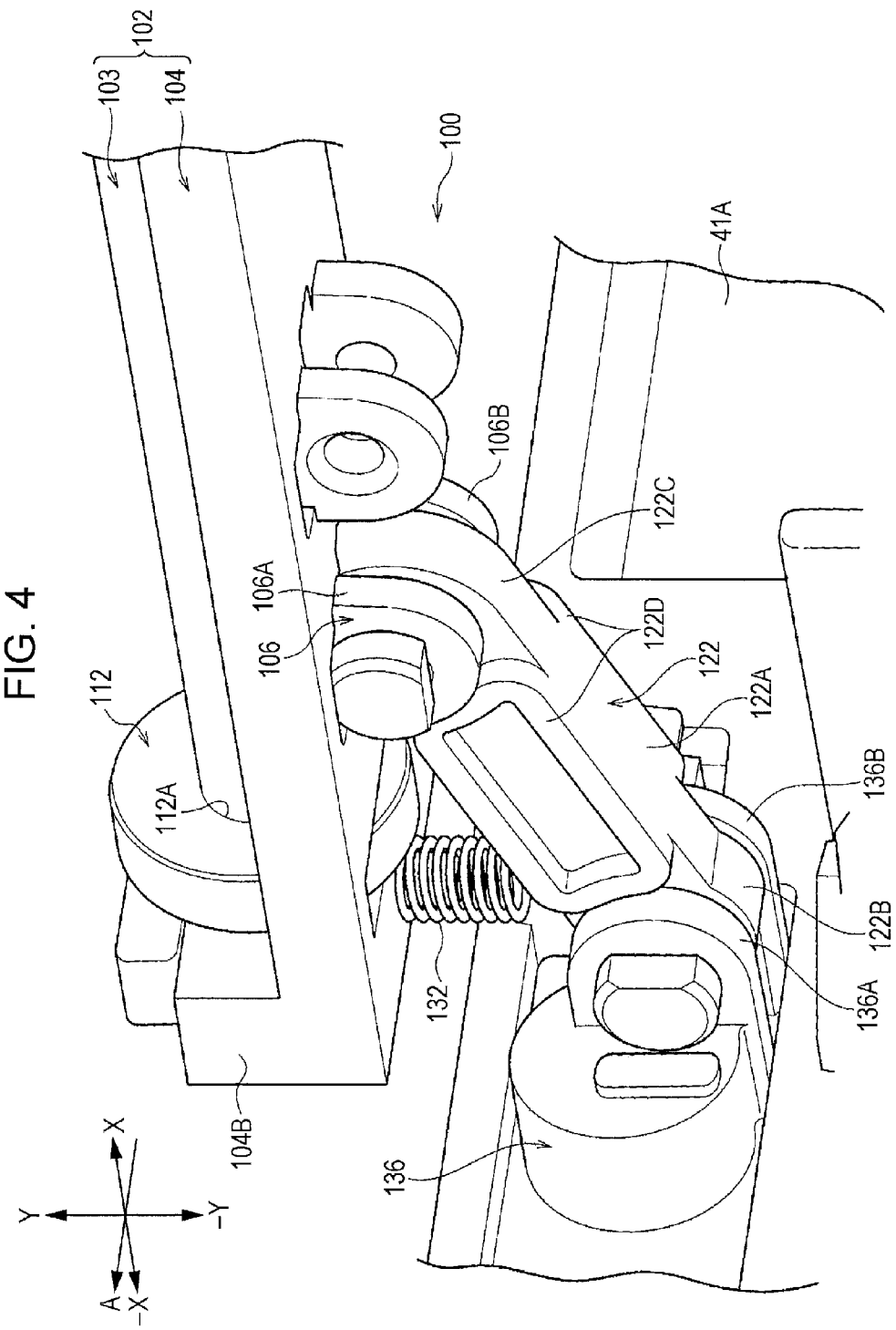
FIG. 4 is an enlarged perspective view of the end of the belt-deviation suppression structure according to this exemplary embodiment.

As shown in FIG. 4, each connection portion 106 has two plate sections 106A and 106B that face each other in the A direction and are spaced apart from each other by a distance that is slightly greater than the thickness of the link member 122 in the A direction. The plate sections 106A and 106B have through-holes (not shown) extending therethrough in the A direction and having a size large enough for inserting a connection pin 135 (see FIG. 5), to be described later, thereto.

Figure 5:
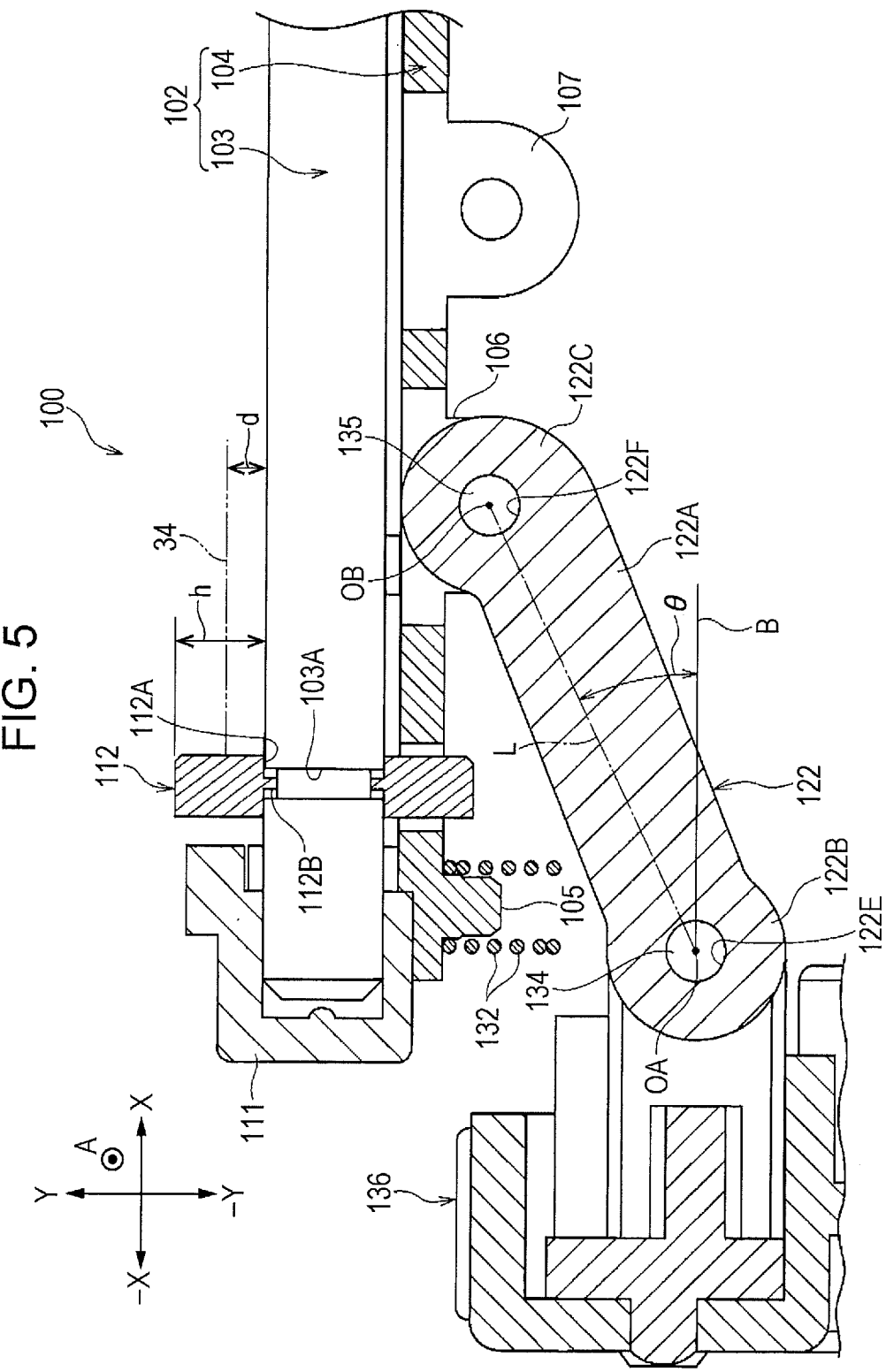
FIG. 5 is a vertical sectional view of the end of the belt-deviation suppression structure according to this exemplary embodiment.

As shown in FIG. 5, the shaft bearing 111 has a hole. The −X side of the rotatable member 103 is fitted into the hole. The diameter of the hole is slightly larger than the outer diameter of the rotatable member 103 so that the rotatable member 103 is rotatable. The shaft bearings 111 and 113 are, for example, fitted and fixed within recesses (not shown) formed in the regulating portion 104B and the regulating portion 104C (see FIG. 2) so that displacement of the rotatable member 103 in the X direction may be prevented.

Receiver

As shown in FIG. 4, the receiver 112 is formed of, for example, a ring-shaped (washer-shaped) member with a through-hole 112A formed at the center of the ring and having an inner diameter that is slightly larger than the outer diameter of the rotatable member 103. Furthermore, as shown in FIG. 5, the receiver 112 has a protrusion 112B protruding from the hole wall of the through-hole 112A toward the inner side in the radial direction. The protrusion 112B has a size that allows it to be accommodated within the recess 103A of the rotatable member 103.

With regard to the receiver 112, the through-hole 112A thereof receives the rotatable member 103, and the protrusion 112B is accommodated within the recess 103A, so that the movement of the receiver 112 in the X direction is regulated, and the receiver 112 is rotatable together with the rotatable member 103. A height h of the receiver 112 relative to the rotatable member 103 (i.e., a height in the radial direction from the outer peripheral surface of the rotatable member 103) is greater than a thickness d of the intermediate transfer belt 34.

Link Member

As shown in FIG. 5, the link member 122 is, for example, an integrally molded body constituted of an arm segment 122A extending in one direction, a first connection segment 122B located at a first end of the arm segment 122A, and a second connection segment 122C located at a second end of the arm segment 122A.

Arm Segment

The arm segment 122A is a plate-shaped segment. The opposite surfaces of the arm segment 122A in the A direction are provided with protrusions 122D (see FIG. 4) that protrude outward.

First Connection Segment

The first connection segment 122B has the shape of a ring with an outer diameter that is greater than the width of the arm segment 122A in the lateral direction. Specifically, a through-hole 122E extending in the A direction is formed in the center of the first connection segment 122B. A columnar connection pin 134 whose axis extends in the A direction is fitted in the through-hole 122E.

The connection pin 134 is fitted into through-holes (not shown) formed in plate sections 136A and 136B (see FIG. 4) of an attachment member 136 as an example of a base to be described later, and also into the through-hole 122E in the first connection segment 122B. The opposite axial ends of the connection pin 134 (in the A direction) are increased in diameter so that the connection pin 134 is prevented from falling off. Accordingly, the first connection segment 122B of the link member 122 is connected to the attachment member 136 in a rotatable manner about an axis extending in the A direction.

Attachment Member

As shown in FIGS. 4 and 8, the attachment member 136 is an integrally molded body constituted of a columnar fixation portion 136C, whose −X side is fixed to the aforementioned sidewall 41A, and the aforementioned plate sections 136A and 136B protruding toward the X side from the X side surface of the fixation portion 136C. The plate sections 136A and 136B are disposed facing each other with a certain distance therebetween in the A direction. The distance between the plate section 136A and the plate section 136B is slightly greater than the thickness of the first connection segment 122B of the link member 122 in the A direction.

Examples of how the fixation portion 136C is fixed to the sidewall 41A include a method of pressure-fitting a boss of the fixation portion 136C into a hole in the sidewall 41A, a method of adhering the fixation portion 136C to the sidewall 41A by using an adhesive, and a method of fastening the fixation portion 136C to the sidewall 41A by using a screw. Since the attachment member 136 at the sidewall 41B side (see FIG. 2) has a similar configuration, a description thereof will be omitted.

Second Connection Segment

As shown in FIG. 5, the second connection segment 122C has the shape of a ring with an outer diameter that is greater than the width of the arm segment 122A in the lateral direction. Specifically, a through-hole 122F extending in the A direction is formed in the center of the second connection segment 122C. A columnar connection pin 135 whose axis extends in the A direction is fitted in the through-hole 122F.

The connection pin 135 is fitted into through-holes (not shown) formed in the plate sections 106A and 106B (see FIG. 4) of the connection portion 106 and also into the through-hole 122F in the second connection segment 122C. The opposite axial ends of the connection pin 135 (in the A direction) are increased in diameter so that the connection pin 135 is prevented from falling off. Accordingly, the second connection segment 122C of the link member 122 is connected to the contact member 102 in a rotatable manner about an axis extending in the A direction.

In an X-Y plane, the center of rotation of the first connection segment 122B is defined as a point OA, the center of rotation of the second connection segment 122C is defined as a point OB, and a line that connects the point OA and the point OB is defined as a line L. Furthermore, a line that extends through the point OA and is parallel to the X direction is defined as a line B. In this case, the line L is inclined at an angle θ relative to the line B. Specifically, the second connection segment 122C is disposed toward the center of the contact member 102 in the X direction relative to the first connection segment 122B. In this exemplary embodiment, the components are disposed such that the angle θ ranges between, for example, 10° and 40°.

As shown in FIG. 2, in the belt-deviation suppression structure 100, the two link members 122 and 124 arranged in the X direction relative to the contact member 102 are disposed as oblique sides of an isosceles trapezoid whose lower base at the −Y side is longer than its upper base at the Y side.

Compression Coil Springs

Figure 3:
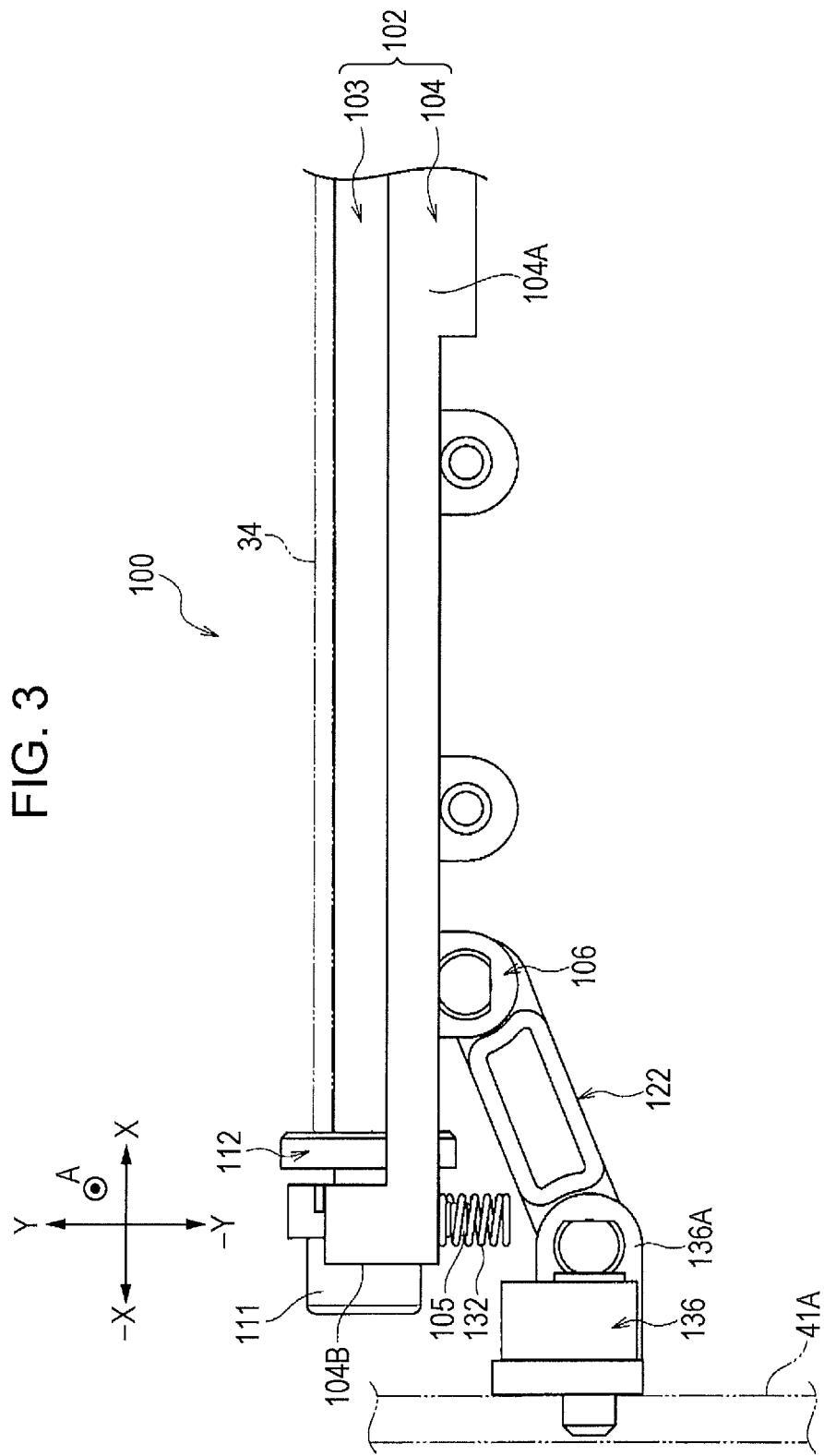
FIG. 3 is an enlarged view of an end of the belt-deviation suppression structure according to this exemplary embodiment.

As shown in FIGS. 3 and 5, in the belt-deviation suppression structure 100, each boss 105 of the support member 104 is fitted in the corresponding compression coil spring 132. Specifically, with regard to each compression coil spring 132, the Y end thereof is attached to the corresponding boss 105, whereas the −Y end thereof acts as a free end that is expandable and contractible in the Y direction.

Furthermore, for example, the −Y end of the compression coil spring 132 is disposed at the Y side of (i.e., above) the link member 122 and is configured to come into contact with the Y surface (upper surface) of the link member 122 when the contact member 102 and the link member 122 move. The compression coil spring 132 is configured to apply a resistance force against a force acting in a direction in which the contact member 102 and the link member 122 comes into contact with each other. Moreover, the compression coil spring 132 is configured to apply a bias force for moving the contact member 102 toward the Y side when the link member 122 pivots upward toward the Y side. The compression coil spring 132 at the sidewall 41B side (see FIG. 2) has a similar configuration.

Operation

Next, the operation of this exemplary embodiment will be described.

As shown in FIG. 6A, in the belt-deviation suppression structure 100, when the intermediate transfer belt 34 rotates in the A direction, the rotatable member 103 that is in contact with the inner surface of the intermediate transfer belt 34 is rotated. Thus, in the belt-deviation suppression structure 100, a frictional force (load) acting on the intermediate transfer belt 34 may be reduced, as compared with a case where the rotatable member 103 is fixed.

Figure 7A:
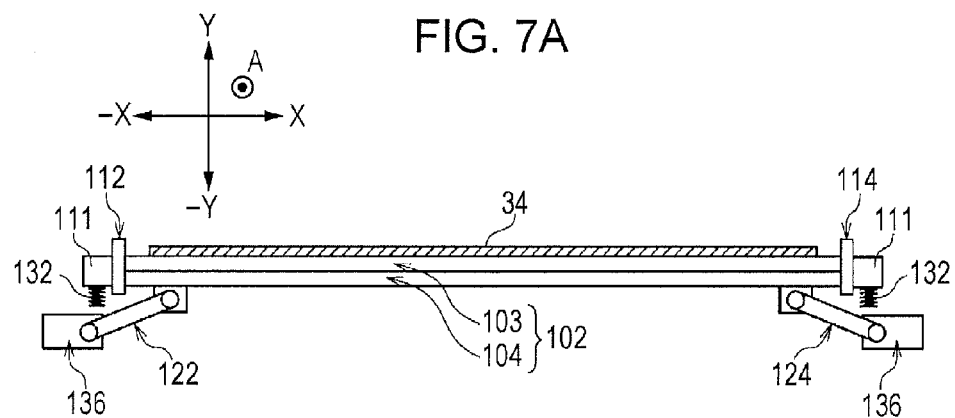
FIG. 7A schematically illustrates the belt-deviation suppression structure when the rotatable member according to this exemplary embodiment is set at an initial position, FIG. 7B schematically illustrates a state where the intermediate transfer belt according to this exemplary embodiment has moved toward one end of the rotatable member, and FIG. 7C schematically illustrates a state where the intermediate transfer belt according to this exemplary embodiment has moved toward the other end of the rotatable member.

Subsequently, in a state where there is no movement of the intermediate transfer belt 34 in the X direction as shown in FIG. 7A, there is no movement of the contact member 102 and the link members 122 and 124 in the X direction. Then, the intermediate transfer belt 34 rotates in the A direction without coming into contact with the receiver 112 and the receiver 114.

Subsequently, for example, if the state of tension of the intermediate transfer belt 34 changes due to some factor, such as maintenance performed on the transfer device 30 (see FIG. 1), the intermediate transfer belt 34 may sometimes move in the X direction (i.e., toward the +X side or the −X side). In this case, it is assumed that the intermediate transfer belt 34 has moved toward the X side as an example.

Then, if the intermediate transfer belt 34 continues to move (i.e., positionally deviates) toward the X side as shown in FIG. 6B, the X edge of the intermediate transfer belt 34 comes into contact with the −X side surface of the receiver 114. This causes the receiver 114 to receive, from the intermediate transfer belt 34, a pressing force F acting toward the X side. Due to this pressing force F, the contact member 102 moves toward the X side, and the link member 124 connected to the contact member 102 pivots upward toward the Y side (i.e., the angle θ (see FIG. 5) increases).

As the link member 124 pivots upward toward the Y side, the link member 122 connected to the contact member 102 at the −X side of the contact member 102 pivots downward toward the −Y side (i.e., the angle θ (see FIG. 5) decreases), as shown in FIG. 6C. In this case, although the contact member 102 and the link member 122 move closer to each other, a resistance force that resists the contact member 102 and the link member 122 from coming into contact with each other is applied due to the corresponding compression coil spring 132 coming into contact with the Y surface of the link member 122. Specifically, even in a case where the contact member 102 moves by a large amount, sudden shifting of the contact member 102 is suppressed (i.e., attenuated) by the compression coil spring 132.

If the compression coil spring 132 contracts by an amount greater than its natural length, the restoring force of the compression coil spring 132 acts as a lifting force that lifts the contact member 102 toward the Y side. Therefore, when the link member 122 in its lowered state pivots upward toward its initial position (i.e., a position at which the aforementioned isosceles trapezoid is formed), the operational load for the upward pivot may be reduced, as compared with a configuration that does not have the compression coil springs 132.

Figure 7B:
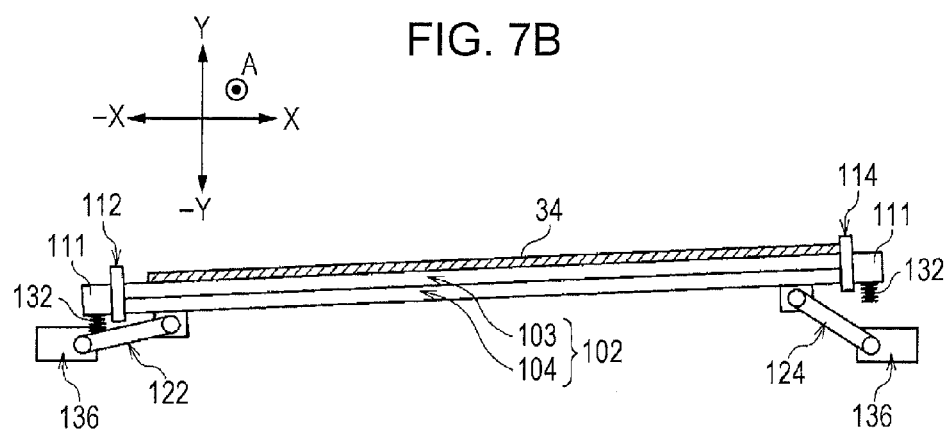

Subsequently, when the X end of the contact member 102 moves upward toward the Y side as shown in FIG. 7B, the tension at the X edge of the intermediate transfer belt 34 becomes greater than the tension at the −X edge thereof, thus causing the intermediate transfer belt 34 to move toward the −X side with the lower tension. In other words, the intermediate transfer belt 34 moves in a direction orthogonal to the axial direction of the tilted rotatable member 103.

Specifically, a reaction force that returns the intermediate transfer belt 34 toward the center in the X direction acts on the intermediate transfer belt 34. Due to a balanced state between this reaction force and the force that moves the intermediate transfer belt 34 toward the X side, movement of the intermediate transfer belt 34 in the X direction is suppressed (i.e., deviation is suppressed). In this case, movement of the contact member 102 in the X direction also stops. Therefore, the contact member 102 is maintained in a tilted state where the X end thereof is positioned higher than the −X end thereof.

Furthermore, as shown in FIG. 2, in the belt-deviation suppression structure 100, the rotatable member 103 is in contact with the inner surface of the intermediate transfer belt 34 entirely in the X direction so as to support the intermediate transfer belt 34. Therefore, in the belt-deviation suppression structure 100, the orientation of the intermediate transfer belt 34 may be made stable, as compared with a configuration in which deviation is suppressed by bringing components into contact with only the edges of the intermediate transfer belt 34, thereby allowing for stable rotation of the intermediate transfer belt 34. Furthermore, since the belt-deviation suppression structure 100 may be installed within the transfer device 30, the dimension in the axial direction does not have to be sacrificed, as compared with a configuration in which deviation is suppressed by bringing components into contact with only the edges of the intermediate transfer belt 34, thereby allowing for size reduction of the device.

Figure 7C:
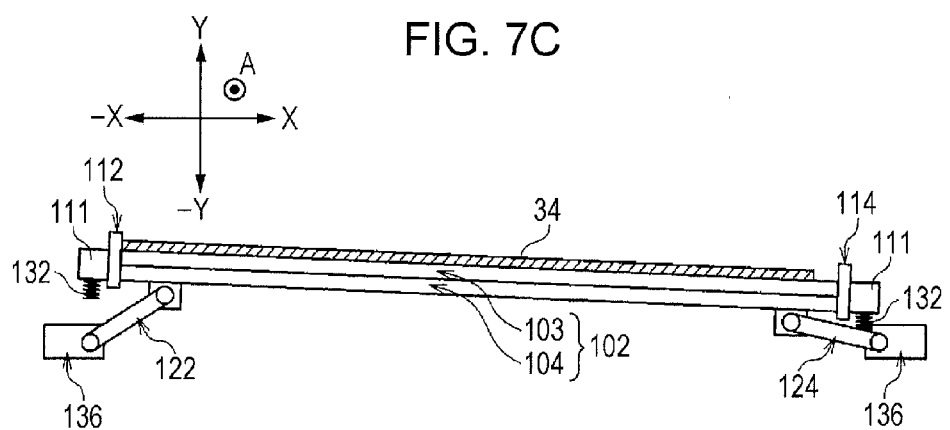

As shown in FIG. 7C, if the intermediate transfer belt 34 moves toward the −X side, the link member 122 pivots upward, whereas the link member 124 pivots downward. Then, the contact member 102 is maintained in a tilted state where the force that moves the intermediate transfer belt 34 toward the −X side and the force that moves the intermediate transfer belt 34 toward the X side are balanced, thereby suppressing movement (i.e., deviation) of the intermediate transfer belt 34.

Furthermore, as shown in FIG. 1, in the belt-deviation suppression structure 100, the contact member 102 is disposed upstream of the drive roller 53 and downstream of the driven roller 52 in the A direction (moving direction). Therefore, the contact member 102 is in contact with the intermediate transfer belt 34 in a state where the intermediate transfer belt 34 is pulled by the drive roller 53 so that the contact member 102 moves with high sensitivity relative to movement of the intermediate transfer belt 34 in the X direction, whereby deviation thereof may be suppressed. In contrast, in a case where the contact member 102 is disposed downstream of the drive roller 53 and upstream of the driven roller 52, the intermediate transfer belt 34 having passed the drive roller 53 may sometimes sag, thus causing the movement sensitivity of the contact member 102, which follows the movement of the intermediate transfer belt 34 in the X direction, to decrease.

Furthermore, in the belt-deviation suppression structure 100, the height h of each of the receivers 112 and 114 relative to the contact member 102 is greater than or equal to the thickness d of the intermediate transfer belt 34. Thus, overlapping of the intermediate transfer belt 34 over the receivers 112 and 114 may be suppressed, as compared with a configuration in which the height h of each of the receivers 112 and 114 is smaller than the thickness d of the intermediate transfer belt 34. Since the receivers 112 and 114 are rotatable together with the rotatable member 103, when one of the edges of the intermediate transfer belt 34 comes into contact with the receiver 112 or 114, these components rotate integrally. Thus, the load acting on the edge of the intermediate transfer belt 34 may be suppressed, as compared with a configuration in which the receivers 112 and 114 are not rotatable.

In addition, since deviation of the intermediate transfer belt 34 may be suppressed by the belt-deviation suppression structure 100, transfer misregistration of the toner images TA on the sheet P may be suppressed in the transfer device 30.

Furthermore, in the image forming apparatus 10, deviation of the intermediate transfer belt 34 may be suppressed when the toner images TA are first-transferred onto the intermediate transfer belt 34 from the photoconductors 31 by the first-transfer rollers 36. Moreover, in the image forming apparatus 10, deviation of the intermediate transfer belt 34 may be suppressed when the toner images TA are second-transferred onto the sheet P from the intermediate transfer belt 34 by the second-transfer roller 38. Due to these effects, misregistration of the toner images TA transferred onto the sheet P from the photoconductors 31 may be suppressed in the image forming apparatus 10, thereby suppressing an image defect caused by such transfer misregistration.

The present invention is not limited to the exemplary embodiment described above.

First Modification

Figure 8A:
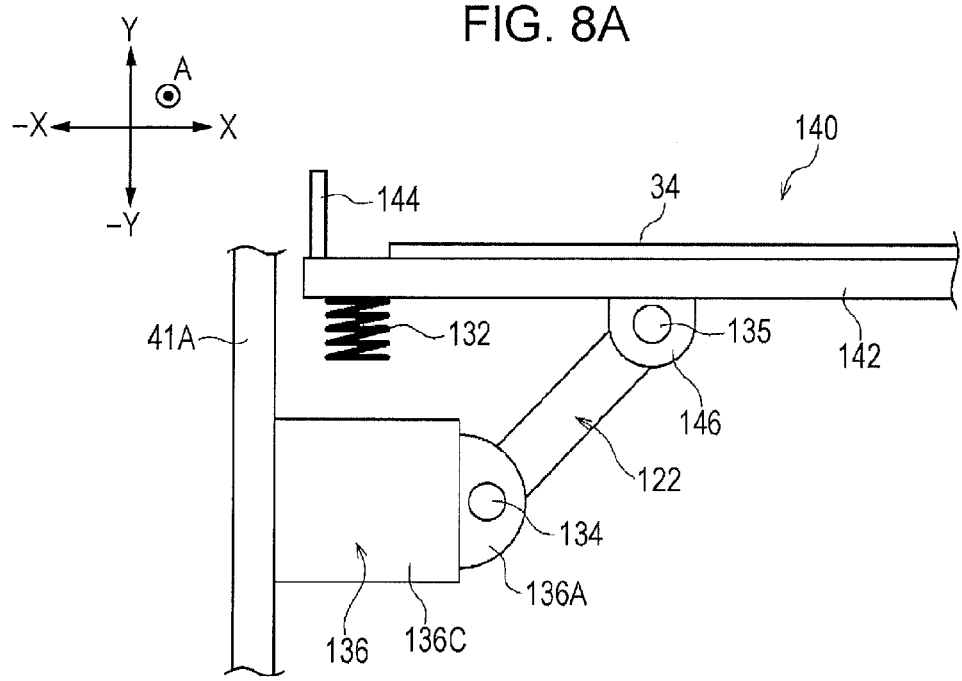
FIGS. 8A and 8B schematically illustrate an end of a belt-deviation suppression structure according to a first modification.
Figure 8B:
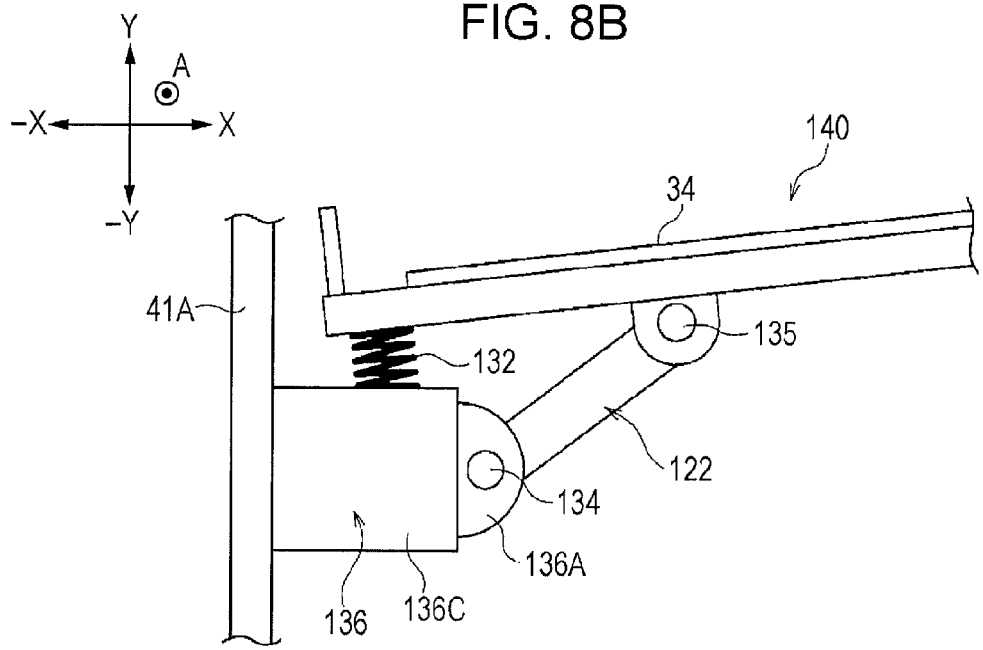

FIGS. 8A and 8B illustrate a belt-deviation suppression structure 140 according to a first modification. The belt-deviation suppression structure 140 is provided with a contact member 142 in place of the contact member 102 (see FIG. 2) in the belt-deviation suppression structure 100 (see FIG. 2). Since components excluding the contact member 142 and the attachment sections of the compression coil springs 132 are similar to those in the belt-deviation suppression structure 100, the same reference characters will be given to those components, and descriptions thereof will be omitted. Furthermore, since the opposite ends in the X direction are symmetrical, the following description will be directed only to the −X side, and a description of the X side will be omitted.

In plan view, the contact member 142 is a rectangular plate (e.g., an acrylic plate). The −Y surface (lower surface) of the contact member 142 is provided with a connection portion 146 connected to one end of the link member 122. The opposite ends of the contact member 142 in the X direction are integrally provided with plate-shaped receivers 144 that stand upright toward the Y side. Accordingly, the belt-deviation suppression structure 140 may have a configuration in which the contact member 142 does not include the rotatable member 103 (see FIG. 2).

Furthermore, in the belt-deviation suppression structure 140, the opposite ends of the contact member 142 in the X direction are provided with bosses (not shown) protruding from the lower surface. The compression coil springs 132 are attached to these bosses. Each of these bosses faces the upper surface of the fixation portion 136C of the corresponding attachment member 136. Thus, when the contact member 142 is tilted, one of the compression coil springs 132 comes into contact with the corresponding fixation portion 136C. Accordingly, a resistance force may be applied by bringing the compression coil spring 132 into contact with the corresponding attachment member 136 as an example of a base.

Second Modification

Figure 9A:
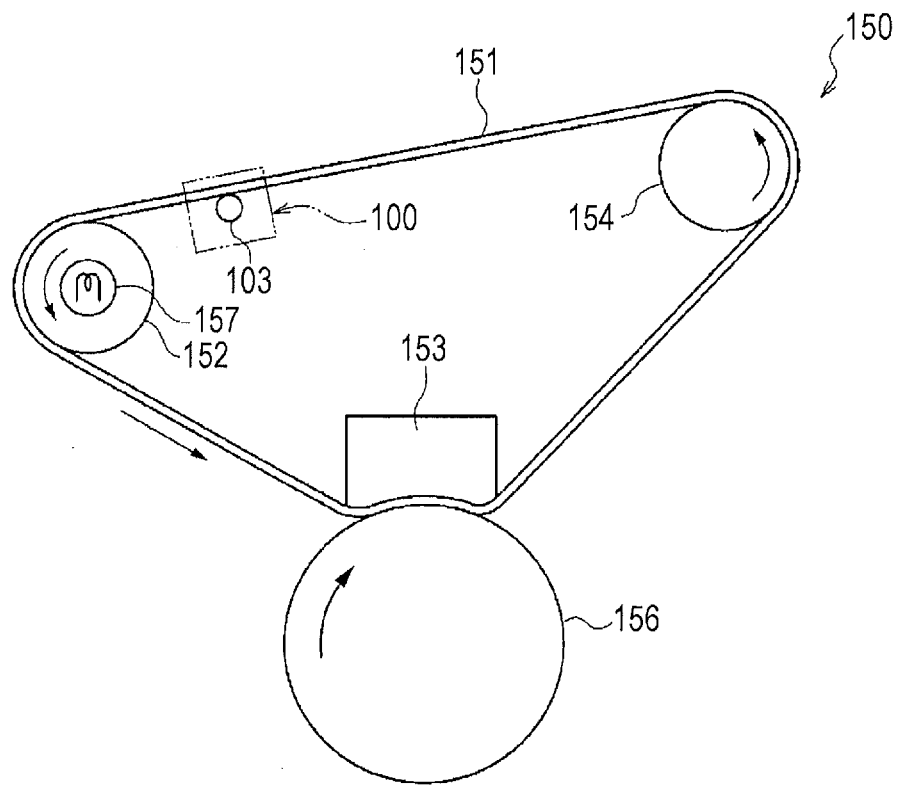
FIG. 9A schematically illustrates a state where a belt-deviation suppression structure according to a second modification is used in a fixing device, and FIG. 9B schematically illustrates a state where a belt-deviation suppression structure according to a third modification is used in a sheet transport device.

FIG. 9A illustrates a fixing device 150 according to a second modification. In the fixing device 150, a fixing belt 151 is wrapped around a drive roller 152, a pressure pad 153, and a driven roller 154, such that the fixing belt 151 is rotatable. Moreover, the fixing device 150 has a pressure roller 156 that presses the fixing belt 151 toward the pressure pad 153, and a halogen heater 157 provided within the drive roller 152.

Furthermore, the fixing device 150 is provided with the belt-deviation suppression structure 100 at a position upstream of the drive roller 152 and downstream of the driven roller 154 in the moving direction (indicated by an arrow) of the fixing belt 151. The rotatable member 103 is in contact with the inner surface of the fixing belt 151. Accordingly, by using the belt-deviation suppression structure 100 in the fixing device 150, deviation of the belt in a direction intersecting the moving direction of the fixing belt 151 may be suppressed. Alternatively, in the fixing device 150, deviation of the belt may be suppressed by disposing the rotatable member 103 in contact with the outer surface of the fixing belt 151.

Third Modification

Figure 9B:
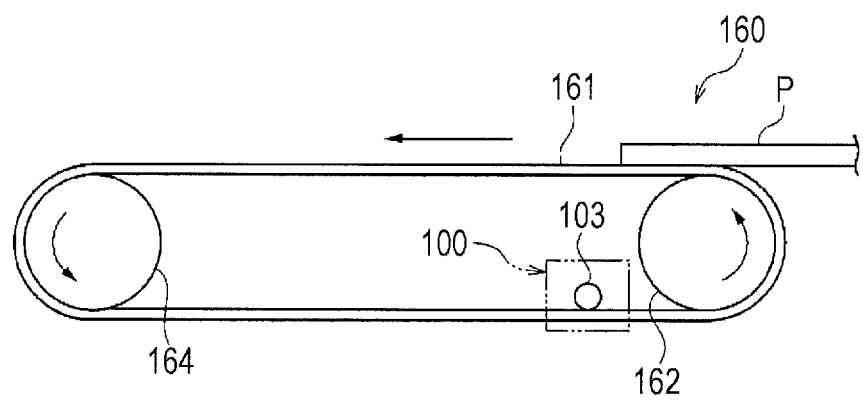

FIG. 9B illustrates a sheet transport device 160 according to a third modification. In the sheet transport device 160, a transport belt 161 is wrapped around a drive roller 162 and a driven roller 164, such that the transport belt 161 is rotatable. Moreover, the sheet transport device 160 is provided with the belt-deviation suppression structure 100 at a position upstream of the drive roller 162 and downstream of the driven roller 164 in the moving direction (indicated by an arrow) of the transport belt 161. The rotatable member 103 is in contact with the inner surface of the transport belt 161.

By using the belt-deviation suppression structure 100 in the sheet transport device 160 as in the third modification, deviation of the transport belt 161, which transports the sheet P, in a direction intersecting the moving direction thereof may be suppressed. In particular, by disposing a photoconductor (not shown) on the transport belt 161 of the sheet transport device 160 so as to form an image forming apparatus that directly transfers a toner image from the photoconductor onto the sheet P, an image defect caused by transfer misregistration of the toner image may be suppressed.

Alternatively, the belt-deviation suppression structure 100 may be provided with the contact member 102 at the outer side of the intermediate transfer belt 34 such that the contact member 102 does not come into contact with the toner images TA. In the case of this configuration, although the installation location of the belt-deviation suppression structure 100 may have to be ensured in the Y direction, a space-saving configuration may still be achieved since the belt-deviation suppression structure 100 is disposed in an area with a dimension that is substantially equivalent to the width of the intermediate transfer belt 34 in the X direction.

The belt is not limited to the intermediate transfer belt 34, the fixing belt 151, or the transport belt 161 and may alternatively be, for example, a photoconductor belt. Moreover, the belt may have a through-hole or a protrusion and a recess.

With regard to each of the receivers 112 and 114, the height h thereof may be smaller than the thickness d of the intermediate transfer belt 34 so long as the intermediate transfer belt 34 does not deviate outward in the X direction. Furthermore, the height of each of the receivers 112 and 114 may be equal to the thickness d of the intermediate transfer belt 34. Moreover, as an alternative to being rotatable together with the rotatable member 103, the receivers 112 and 114 may be rotatable relatively to the rotatable member 103.

Each of the link members 122 and 124 may be multiple link members arranged in the moving direction (A direction) of the intermediate transfer belt 34.

The applying unit is not limited to the compression coil springs 132. Alternatively, other kinds of elastic members, such as plate springs, may be used. Furthermore, the applying unit may include a damper that reduces (i.e., attenuates) a rapid moving speed of the contact member 102.

The base is not limited to multiple components that are spaced apart from each other in the X direction, like the attachment members 136. Alternatively, the base may be constituted of a single component that extends from the −X side to the X side.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A belt-deviation suppression structure comprising:
    a contact member that is in contact with a rotatable belt and that extends longitudinally in an intersecting direction that intersects a moving direction of the belt;
    receivers that are provided at opposite sides of the contact member in the intersecting direction and that receive a pressing force from the belt as the belt moves in the intersecting direction; and
    a plurality of link members that are arranged in the intersecting direction, each link member having a first end that is connected to a base in a rotatable manner about an axis extending in the moving direction and having a second end that is connected to the contact member in a rotatable manner about an axis extending in the moving direction,
    wherein a length of the contact member is set to be equal to or larger than a width of the rotatable belt, and the contact member retains the rotatable belt, the rotatable belt contacting the contact member from end to end, an entirety of the contacting being straight, in the intersecting direction.

2. The belt-deviation suppression structure according to claim 1, wherein the contact member is in contact with an inner surface of the belt.

3. The belt-deviation suppression structure according to claim 1, wherein the belt is wrapped around a drive roller that drives the belt and a driven roller that is driven by the belt, and
    wherein the contact member is disposed upstream of the drive roller and downstream of the driven roller in the moving direction.

4. The belt-deviation suppression structure according to claim 1, wherein at least one end of the contact member is provided with an applying unit that applies a resistance force that resists the contact member and one of the link members or the contact member and the base from coming into contact with each other.

5. A transfer device comprising:
a rotatable belt;
a transfer unit that transfers a developer image on the belt onto a recording medium; and
a belt-deviation suppression structure comprising:
    a contact member that is in contact with a rotatable belt and that extends longitudinally in an intersecting direction that intersects a moving direction of the belt;
    receivers that are provided at opposite sides of the contact member in the intersecting direction and that receive a pressing force from the belt as the belt moves in the intersecting direction; and
a plurality of link members that are arranged in the intersecting direction, each link member having a first end that is connected to a base in a rotatable manner about an axis extending in the moving direction and having a second end that is connected to the contact member in a rotatable manner about an axis extending in the moving direction,
wherein the belt-deviation suppression structure suppresses deviation of the belt in the intersecting direction.

6. An image forming apparatus comprising:
an image bearing member that is disposed facing a belt and that bears a developer image;
a transfer device comprising:
    a rotatable belt,
    a transfer unit that transfers a developer image on the belt onto a recording medium; and
    a belt-deviation suppression structure comprising:
        a contact member that is in contact with a rotatable belt and that extends longitudinally in an intersecting direction that intersects a moving direction of the belt;
        receivers that are provided at opposite sides of the contact member in the intersecting direction and that receive a pressing force from the belt as the belt moves in the intersecting direction; and
        a plurality of link members that are arranged in the intersecting direction, each link member having a first end that is connected to a base in a rotatable manner about an axis extending in the moving direction and having a second end that is connected to the contact member in a rotatable manner about an axis extending in the moving direction,
        belt in the belt deviation suppression structure suppresses deviation of the belt in the intersecting direction; and
an auxiliary transfer unit that transfers the developer image on the image bearing member onto the belt.

* * * * *